United States Patent [19]

Hsieh

[11] Patent Number: 4,744,690

[45] Date of Patent: May 17, 1988

[54] STABILIZER FOR TELESCOPIC STANDS

[76] Inventor: Wu H. Hsieh, No. 178, Chung-shan Second Road, Lu Chou Hsiang, Taipei Hsien, Taiwan

[21] Appl. No.: 98,488

[22] Filed: Sep. 18, 1987

[51] Int. Cl.⁴ .............................................. F16B 7/10
[52] U.S. Cl. ..................... 403/104; 403/37; 248/411
[58] Field of Search .............. 248/411, 413, 188.5, 248/219.2, 125, 295.1, 354.3, 354.4, 218.4; 403/344, 374, 377, 109, 104; 285/302, 310

[56] References Cited

U.S. PATENT DOCUMENTS

| | | | |
|---|---|---|---|
| 1,309,375 | 7/1919 | Taylor | 248/413 |
| 2,327,990 | 8/1943 | Benson | 248/413 |
| 2,842,387 | 7/1958 | Della-Porta | 248/413 |
| 3,604,734 | 9/1971 | Friedman | 403/109 |
| 4,111,575 | 9/1978 | Hoshino | 248/413 X |
| 4,140,415 | 2/1979 | Koyamato | 248/413 |
| 4,185,936 | 1/1980 | Takahashi | 248/188.5 X |
| 4,405,107 | 9/1983 | Clyburn | 248/413 X |
| 4,430,017 | 2/1984 | Stefancich | 248/411 X |
| 4,596,484 | 6/1986 | Nakatani | 403/374 X |

FOREIGN PATENT DOCUMENTS

| | | | |
|---|---|---|---|
| 2630763 | 1/1977 | Fed. Rep. of Germany | 403/109 |
| 2632526 | 1/1978 | Fed. Rep. of Germany | 403/109 |

*Primary Examiner*—J. Franklin Foss
*Assistant Examiner*—Robert A. Olson
*Attorney, Agent, or Firm*—Poms, Smith, Lande & Rose

[57] ABSTRACT

A stabilizer including a female ring installed on a female tube of the telescopic stand and a male ring installed on a male tube of a telescopic stand. The male ring is put in the female ring and a hole is set on each of two outwardly projecting parallel walls. Inside one of the holes of the female ring is a toothed block which is engageable with another toothed block of a handle so that the tightness and relaxation of the stabilizer is determined by rotating the handle to engage or disengage the two toothed blocks. The male ring further has an opening between the two holes of the male ring in which a spring is set to provide the male ring with a better restoring force.

1 Claim, 4 Drawing Sheets

STABILIZER FOR TELESCOPIC STANDS

BACKGROUND OF THE INVENTION

This invention relates to a stabilizer used in telescopic stands, especially stands for holding musical scores, for the adjustment of the height of the telescopic racks.

To comply with different height requirements, telescopic stands, especially musical stands, are usually formed of two or more sleeving tubes for adjustments by extension or shortening. At the present, sleeving tubes are commonly stabilized by setting a screw on the upper end of a female tube and threading the screw from the female tube to contact with an inner male tube, thus fixing the height of the telescopic stand.

Such stabilizers as mentioned above are generally recognized as being inconvenient in actual use since the screw must be tightened or loosened. To solve this problem, this invention discloses a special elastic connection between the female tube and the male tube which can easily adjust the height of the telescopic stand.

SUMMARY OF THE INVENTION

The primary object of this invention is to provide a simple and convenient stabilizing means for adjusting the height of a telescopic stand.

A further understanding of the present invention will be provided to those skilled in the art from the following detailed description and the associated drawings which will first be described briefly.

BRIEF DESCRIPTION OF THE INVENTION

Figure 3A:
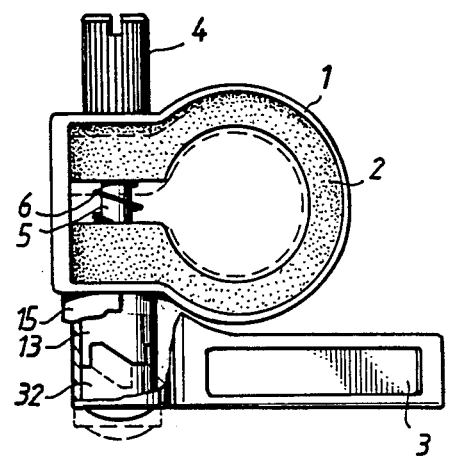
Figure 3B:
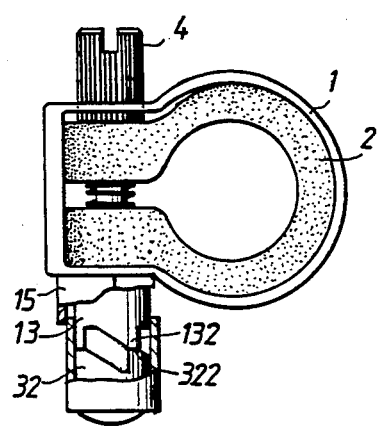
Figure 4:
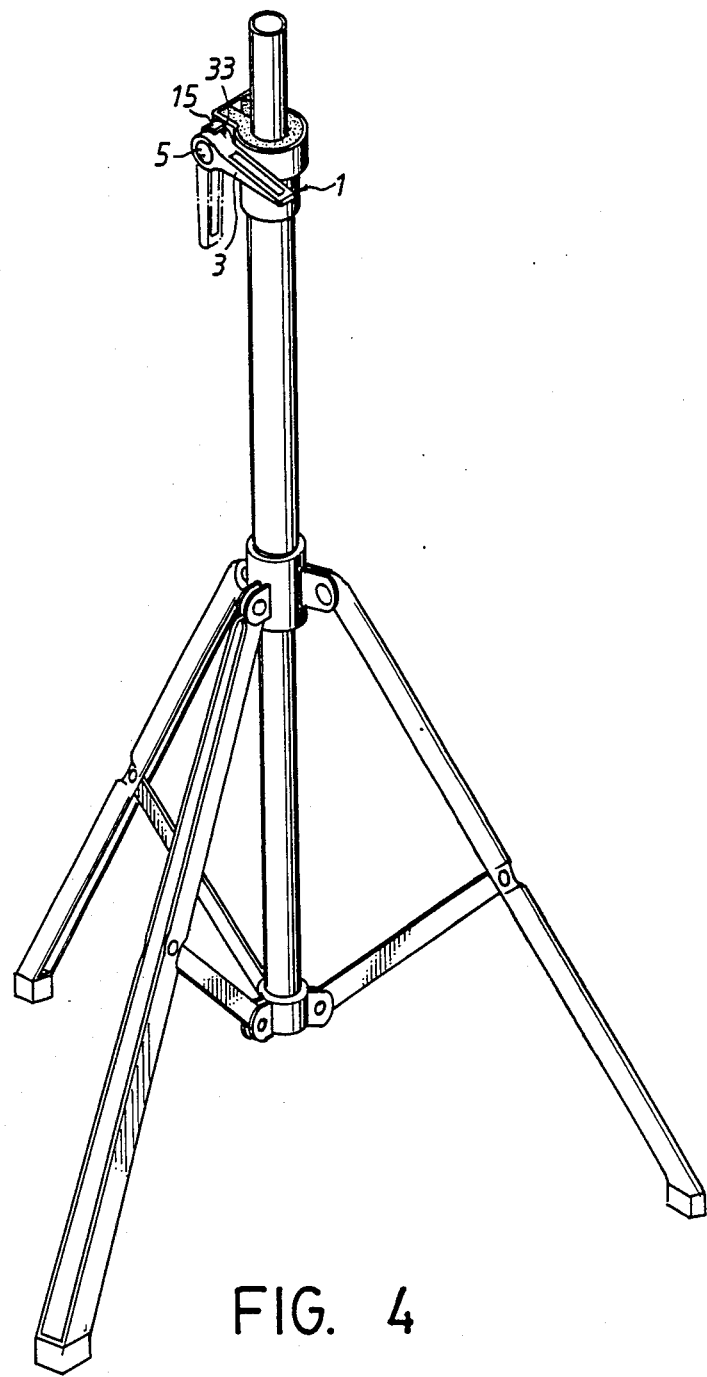

FIG. 3-A is a top perspective view showing a relaxation condition of this invention;

FIG. 3-B is a top perspective view showing a tightness condition of this invention; and FIG. 4 is an embodiment showing the used condition of this invention.

DETAILED DESCRIPTION OF THE PREFERRED EMBODIMENT

Referring to FIG. 1 through FIG. 4, it can be seen that a stabilizer in accordance with the present invention is provided with a female ring 1 (FIG. 2) positioned on a female tube a (FIG. 4) and a male ring 2 (FIG. 2) positioned on a male tube b (FIG. 4) so the height of the telescopic tube can be fixed.

Figure 1:
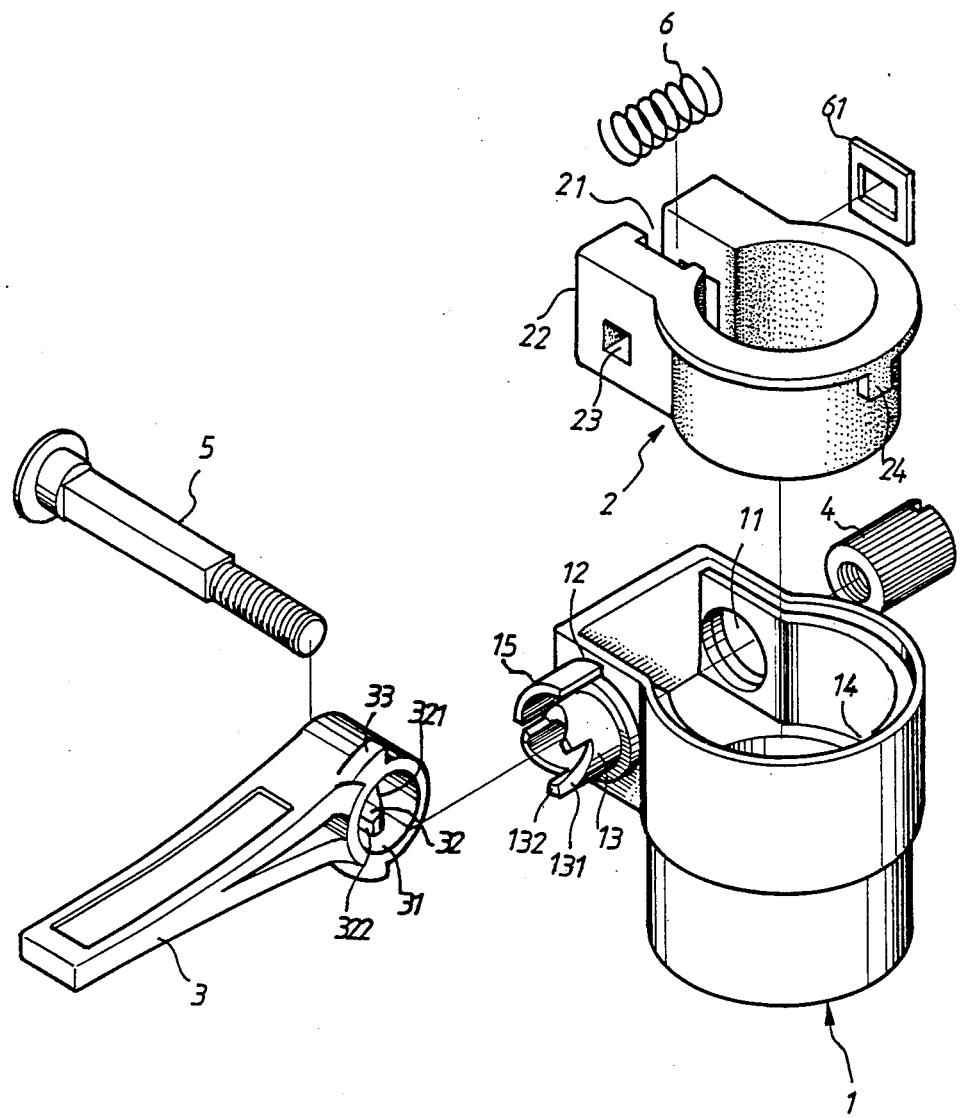
FIG. 1 is a exploded view of this invention.
Figure 2:
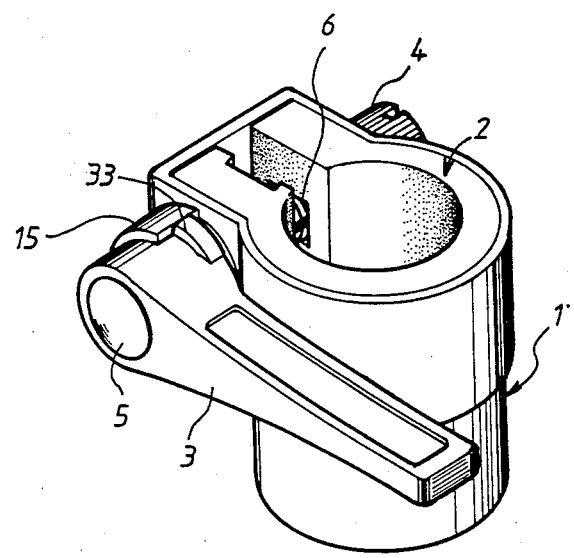
FIG. 2 is an perspective view of this invention.

As shown in FIG. 1 and FIG. 2, the stabilizer comprises a female ring 1, a male ring 2, a rotatable handle 3, a nut 4 and a bolt 5 with a rectangular section. The male ring 2 has an opening 21 extending outwardly from a circumferential wall of the male ring 2 and a square hole 23 is set on each of two extended walls 22 beside the opening 21. The opening 21 is set for putting a spring 6 therein so as to provide the male ring 2 with elasticity.

The female ring 1 has an inner diameter which is larger than the outer diameter of the male ring 2. The female ring has a slot 14 on the top of the circumference thereof so that a block 24 installed on the outside circumference of the male ring 2 can engage into the slot 14 so as to fix the male ring in the inside of the female ring 1. A hole 11 is set on each correspondent wall 12 of the female ring 1 with that of the male ring 2. Especially, one of the holes 11 has an outwardly extending toothed block 13 which is formed of a plurality of toothed elements each having an inclined surface 131 and a top surface 132. Further, a arch-like plate 15 is installed above the toothed block 13 and appears outside when the toothed block 13 and the handle 3 are engaged together.

The handle 3 has a passing hole 31 on the top thereof which also comprises a toothed block 32 which is fittable with the toothed block 13 of the female ring 1 also including an inclined surface numeral 321 and a top surface 322. When the handle 3 envelops the toothed block 13 of the female ring 2, the two toothed blocks 13 and 32 contact each other and whether kthey are engaged or not is determined by rotating the handle. Note that the rotatable angle of the handle 3 is limited to no more than 90 degrees because there is a protuberance 33 installed on the top of the passing hole 31 of the handle 3 which contacts the arch-like plate 15 so that the handle prevented from rotating over 90 degrees.

Once the handle 3 envelops the toothed block 13 of the female ring 1, the squared bolt 5 then is passed through the holes 11 (of the female ring 2) and 23 (of the male ring 1) from the outside of one wall of the female ring 1 and is fixed by threading into the nut 4 from the outside of the other wall of the female ring 1. As mentioned hereinbefore, the spring 6 is installed in the opening 21 of the male ring 2 to provide the male ring 2 with a restoring force. The square holes 23 of the male ring 2 provides the squared bolt 5 with good stability and prevents it from rotating. At the same time, the spring 6 provides elasticity for the reasons of stability. Further, a pad 61 is put between the wall 22 of the male ring 2 and the wall 12 of the female ring 1 to provide better stability of the engagement of the female ring 1 and the male ring 2.

Now referring to FIG. 3A and 3B, the mechanical relationship of the handle 3 and the female ring 2 for tightened and relaxed positions will be described. FIG. 3A shows the relaxed conditon of the stabilizer wherein the dashed-line figure shows the condition when the male ring 1 is tightened. At the same time, the situation of the handle 3 is that as shown in FIG. 1. The toothed block 13 of the female ring 1 and that 32 of the handle 3 are directly engaged so that inclined surfaces 131 and 321 contact each other and the top surfaces 132 and 322 contacting each other. Also, the protuberance 33 of the handle 3 contacts with the arch-like plate 15. To tighten the male ring 2, the handle 3 is rotated downward so that the toothed block 32 of the handle 3 moves and the top surface 322 of the handle 3 contacts with that 132 of the toothed block 13. As the squared bolt 5 is fixed on the female ring 1, the increasing combined width of the two toothed blocks 13 and 32 resulted from such motion will force the opening 21 of the male ring 2 shortened, therefore, a tightness condition as shown in FIG. 3B is completed.

Accordingly, a stabilizer in accordance with this invention is especially applicable to telescopic stands which should be adjusted in height very frequently, since the adjustment of the stabilizer is very easy.

The above examples and description have been given for the purpose of illustration, and are not intended to be limitative. Many variations can be effected in the mechanical structure presented hereinabove without exceeding the scope of the invention.

I claim:

1. A stabilizer for a telescopic stand comprising:

(a) a male ring having an opening formed by an outwardly extending circumference of said male ring; two extended walls of said opening, each extended wall having a respective square hole thereon; a block being set on the outside circumference of said male ring so as to be engageable with a slot on the inside of a circumference of a female ring;

(b) said female ring being larger than said male ring and said male ring being installed into said female ring; a hole being set on each correspondent wall on said female ring with said male ring, wherein an outside of one of said holes has a toothed block set proximate thereto; said toothed block being formed of a plurality of toothed elements, each toothed element being composed of an inclined surface and a top surface; an arch-like plate being installed above said toothed block which appears when a handle is enveloped said toothed block;

(c) said handle also having a toothed block which is engageable with said toothed block of said female ring which is installed on a passing hole set on top of said handle; a protuberance being installed on a top of said passing hole which contacts with said arch-like plate when said handle envelops said toothed block of said female ring so as to limit said handle's angle of rotation to no more than 90 degrees;

(d) a squared bolt passing through said passing hole of said handle, said holes of said female ring and said square holes of said male ring being fixed on an outside circumference of said female ring by threading into a nut;

(e) a spring being installed on said opening of said male ring and encompassing said squared bolt; and (f) a pad with a hole being set between said hole of said male ring and of said female ring; said stabilizer is adapted to be provided on a connection position of a female tube and a male tube of the telescopic stand with said female ring being set on said female tube and said male ring being set on said male tube.

* * * * *